Nov. 11, 1958   R. E. ARKO   2,859,628
VARIABLE CLEARANCE RACK AND PINION DEVICE
Filed April 30, 1957
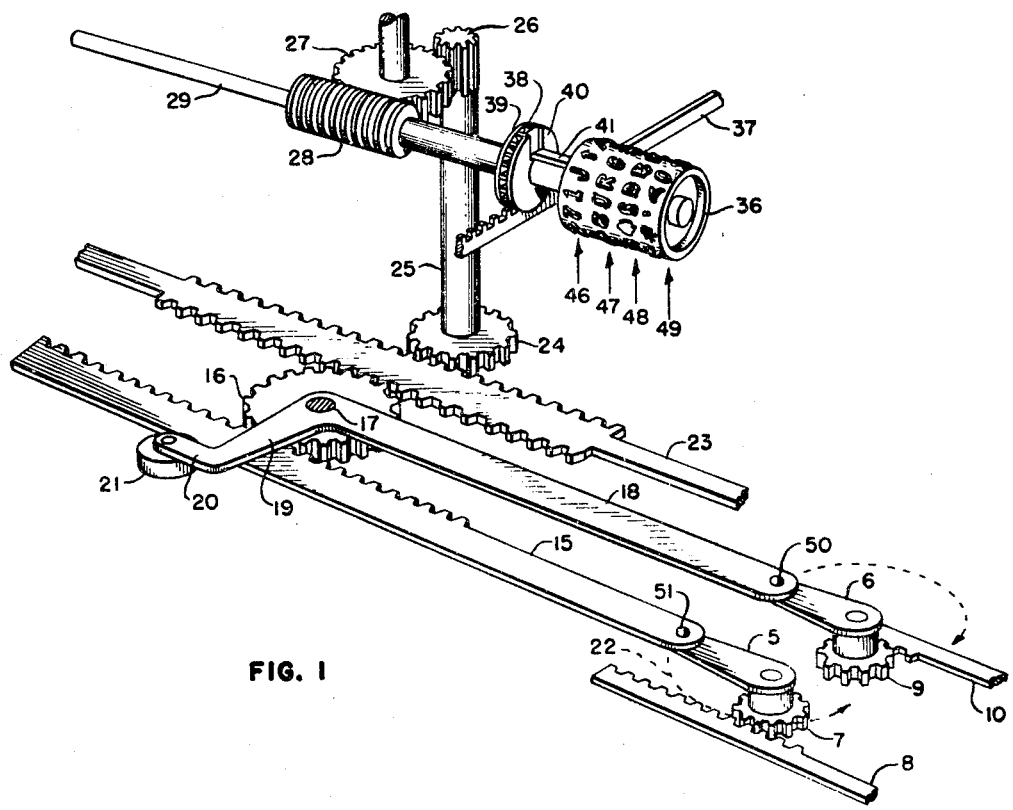
FIG. 1
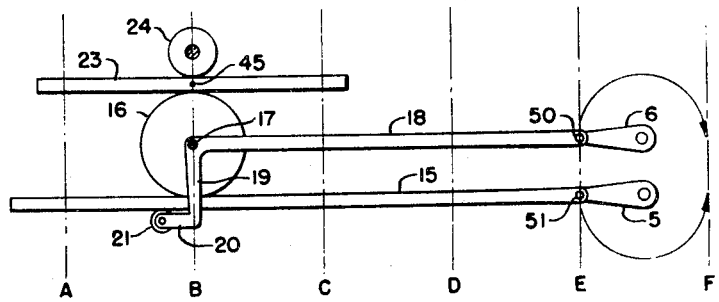
FIG. 2
INVENTOR
ROBERT E. ARKO
ATTORNEY

United States Patent Office 2,859,628
Patented Nov. 11, 1958

2,859,628

VARIABLE CLEARANCE RACK AND PINION DEVICE

Robert E. Arko, Mount Prospect, Ill., assignor to Teletype Corporation, Chicago, Ill., a corporation of Delaware Application April 30, 1957, Serial No. 656,058

9 Claims. (Cl. 74—33)

This invention relates to a positioning apparatus and more particularly to a variable clearance rack and pinion arrangement for selectively positioning a telegraph printer typewheel and locking it in a selected position.

It is an object of the present invention to provide a simple and effective apparatus for accurately positioning an element.

Another object of the invention is to provide apparatus for accurately positioning a shaft in a selected position and automatically locking it in the selected position.

A still further object of the invention is to provide apparatus in which a rack and pinion arrangement that accurately positions a typewheel of a printing telegraph apparatus is constructed so that it locks the typewheel in any one of a plurality of selected positions.

An apparatus embodying the novel features of the invention comprises a pair of individually operable crank arms one of which actuates a rack in mesh with a pinion that is mounted on a pitman lever connected to the second of said crank arms and which pitman lever carries at its end remote from the crank arm an extension directed longitudinally of the rack. The extension carries a roller which in either of the extreme positions of the crank arms will lock the pinion against rotation. The pinion also meshes with a second rack which may constitute the element to be positioned and which is reciprocated by the pinion on movement of either of the crank arms.

A preferred form of the invention includes in addition to the previously described mechanical movements a second pinion in mesh with teeth formed on the second mentioned rack which pinion drives a typewheel shaft to its various positions through a gear train.

A better understanding of the invention may be had by reference to the following detailed description when considered in conjunction with the accompanying drawings wherein:

Fig. 1 is a perspective view of the preferred form of the invention; and

Fig. 2 is a diagrammatic view illustrating the various movements which may be imparted to the mechanisms shown in Fig. 1.

In the drawing, wherein like reference characters designate the same parts in the two views, particular reference first being had to Fig. 1, there is shown a pair of crank arms 5 and 6. The crank arms 5 is suitably attached to a pinion 7 which may be oscillated by a rack 8 to move the crank arm 5 through 180°. Similarly, the crank arm 6 is suitably secured to a pinion 9 which may be oscillated by a rack 10 to move the crank arm 6 through 180° in a direction opposite to the direction in which the crank arm 5 is moved. Crank arm 5 has pivotally connected thereto a rack 15, the teeth of which mesh with a pinion 16. Pinion 16 is rotatably mounted on a stud shaft 17 that is fixed to a pitman lever 18. The pitman lever 18 is pivotally connected to the crank arm 6 for actuation thereby and has a transversely extending arm 19 formed integrally with a longitudinally extending portion or lever arm 20 on which there is freely mounted a roller 21.

When the apparatus is in the position shown in Fig. 1 the rack 15 will be tightly wedged into engagement with the pinion 16 and will lock the pinion 16 against any possible movement. Similarly, when the crank arm 5 is rotated through 180° in the arc indicated by the dot and dash line 22 the rack 15 will be tightly locked against the pinion 16.

Pinion 16 also meshes with the teeth on the forward side of a double sided rack 23 which is suitably mounted for reciprocation and which when reciprocated will drive a gear 24. The gear 24 is fixed to a shaft 25 which has a second gear 26 mounted on its end opposite to the end on which the gear 24 is attached. The gear 26 in turn meshes with a larger gear 27. The gear 27 is in mesh with a cylindrical rack 28 fixed to a typewheel shaft 29. A typewheel 36 on which there are embossed four rows 46, 47, 48 and 49 of characters which extend circumferentially around it is fixed to the typewheel shaft. Thus, the typewheel 36 may be positioned in any one of four positions, axially, to align the rows 46, 47, 48 or 49 of characters embossed thereon with a printing hammer (not shown) associated with a tape or sheet of paper (not shown) on which the characters are to be printed.

Rotary movement may be imparted to the typewheel 36 by a rack 37 which is held in mesh with a pinion 38 by a pair of retainer discs 39 and 40. The pinion 38 and the discs 39 and 40 are slidably keyed to the shaft 29 as a unit by means of a key 41 whereby the shaft 29 may be reciprocated with respect to the pinion 38 but will be rotated thereby by mechanisms well known in the art and which have not been disclosed herein since they are not essential to an understanding of the present invention.

The mode of operation of the apparatus will be more readily understood by referring to Fig. 2 wherein the mechanical parts have been illustrated diagrammatically. In the operation of the apparatus the rack 23 will be moved to any one of four different positions and consequently will accordingly position the typewheel 36. With the apparatus in the position shown in Figs. 1 and 2 the rack 23 will be so positioned that a point designated by the reference numeral 45 will be aligned with the dot and dash reference line B (Fig. 2). In this position the row of type, designated by the numeral 47, on the typewheel 36, will be under the type hammer. If the crank arm 5 is moved 180° from the position shown in Figs. 1 and 2 while the crank arm 6 is held stationary, the rack 15 will move to the right and consequently will impart counterclockwise rotation to the pinion 16. This will result in the point 45 on the rack 23 being moved into alignment with the dot and dash reference line designated A (Fig. 2). Referring back to Fig. 1 movement of the rack 23 to the left as described in connection with the diagram in Fig. 2 will result in a movement of the typewheel 36 to the right one position to thus align the line or row of type designated by the reference numeral 46 with the printing hammer.

If the crank arm 5 is maintained in the position shown in Figs. 1 and 2 and the crank arm 6 is rotated 180° in a clockwise direction the pitman lever 18 will be moved to the right to carry its point of pivotal connection with the crank arm 6, as designated by the numeral 50, from alignment with reference line E to alignment with reference line F. In so doing the pitman lever 18 will carry the pinion 16 to the right one place or to a point where the axis of the shaft 17 will move from alignment with reference line B to alignment with reference line C. When the pitman lever 18 is moved as just described to carry the axis of the shaft 17 from reference line B to reference line C the pinion 16 in moving bodily through one of the positions will roll on the rack 15 and consequently the point 45 on rack 23 will be moved from alignment with reference line B to alignment with reference line D. This will result in the typewheel being moved from a position where the row of characters 47 is under the printing hammer to a position where the row of characters designated by the reference numeral 49 is under the printing hammer.

When the crank arm 5 is rocked counterclockwise to carry its point of pivotal connection with the rack 15, as designated by the numeral 51, from alignment with the reference line E to alignment with the reference line F and the crank arm 6 is moved in a clockwise direction carrying point 50 from alignment with the line E to alignment with the line F, the axis of the shaft 17 will move from alignment with the reference line B to alignment with the reference line C but no rotation will be imparted to the pinion 16 due to the fact that, as it is moved bodily to the right, the rack 15 is also moving bodily to the right. Thus, when both crank arms are rotated 180° from the position shown in the drawings, the typewheel 36 will be moved to a position where the row of type 48 is directly under the printing hammer.

With the arrangement described, there is ample clearance between the mating teeth of rack 15 and pinion 16 during movement of either the rack or the pinion caused by actuating either one of the cranks 5 or 6 since as soon as either the crank arm 5 or the crank arm 6 starts to move out of the position shown in the drawing, or the position 180° from the position shown in the drawing, the wedging action between the teeth on the rack 15 and the teeth on the pinion 16 is released. This is effected because the roller 21 is radially displaced from the axis of the shaft 17 a distance greater than the shortest possible distance it could be removed from the axis of the shaft 17 if it were mounted directly on the arm 19 rather than on the longitudinally extending portion 20. It is believed to be apparent that, with the pitman lever 18 in the position shown and the rack 15 in the position shown, the rack 15 will be tightly wedged into the teeth of the pinion 16 whereas when either one of the crank arms 5 or 6 is moved from its position as shown in the drawings, this wedging action is immediately relieved and consequently the pinion 16 may be readily rotated.

When the crank arm 6 starts to move from either of its extreme positions roller 21 will start to move in an arc about the axis of the stud shaft 17 thereby to release the wedging action between pinion 16 and rack 15. Similarly, when crank arm 5 starts to move out of either of its extreme positions it will start to pivot about the roller 21 to relieve the wedging action. Thus, the first action which occurs, when the crank arms 5 or 6 are moved, is the release of the wedging pressure between the rack 15 and the pinion 16.

With this arrangement ample clearance or backlash is provided between the mating teeth of the rack and pinion during the movement of either the rack or the pinion caused by the crank arms but the pinion and rack are tightly wedged together to substantially eliminate any gear play when the crank drives are at their rest positions.

It is to be understood that the above-described arrangement of components and construction of elemental parts are simply illustrative of several applications of the principles of the invention and many other modifications may be made without departing from the invention.

What is claimed is:

1. A positioning apparatus comprising a pinion gear, an element connected to said pinion gear to be driven thereby, crank means movable from one extreme position to another, means interconnecting said crank means and said pinion gear for moving said pinion gear bodily when the crank means is moved, means for mounting said pinion gear for rotation on said interconnecting means, a rack meshing with said pinion gear to cause said gear to rotate when said gear is moved bodily, and means mounted on said interconnecting means for wedging said rack into locked engagement with said pinion gear at extreme positions of said crank means and for releasing said pinion gear upon initiation of movement of said crank means out of its extreme positions.

2. Shaft positioning apparatus comprising a first crank arm, a second crank arm, a rack for actuation by said second crank arm, a pitman lever for actuation by said first crank arm, an intermediate pinion freely rotatably mounted on said lever for bodily movement with said lever, a lever arm extending normal to said lever and having a lateral extension, a roller mounted on said extension to engage said rack and hold it in mesh with said intermediate pinion, and a shaft positioning rack in mesh with said intermediate pinion.

3. A positioning apparatus comprising a pinion gear, means driven by said pinion gear for aligning rows of type on a printing typewheel with a predetermined position, a first crank means, means actuated by said first crank means for moving said pinion gear bodily, means for mounting said pinion gear for rotation on said means actuated by said first crank means, a rack meshing with said pinion gear to cause said gear to rotate when said gear is moved bodily, a second crank means for moving said rack from a first to a second position, and means mounted on said means actuated by said first crank means for wedging said rack into locked engagement with said pinion gear at extreme positions of both of said crank means and for releasing said wedging action upon initiation of movement of either of said crank means out of their extreme positions.

4. A positioning apparatus comprising a pinion gear, an element in mesh with said pinion gear to be positioned thereby, crank means, means actuated by said crank means for moving said pinion gear bodily, means for rotatably mounting said pinion gear on said means actuated by said crank means, a rack meshing with said pinion gear to cause said gear to rotate when it is moved bodily, means for moving said rack to rotate said pinion gear, and means on said means actuated by said crank means for wedging said rack into locked engagement with said pinion gear at extreme positions of said crank means and for releasing said pinion gear upon movement of said crank means out of extreme positions.

5. A positioning apparatus comprising a pinion gear, an element connected to said pinion gear to be driven thereby, crank means, means movable by said crank means from one extreme position to another for moving said pinion gear bodily, means for mounting said pinion gear for rotation on said means movable by said crank means, a rack meshing with said pinion gear to cause said gear to rotate when it is moved bodily, means mounted on said means movable by said crank means for wedging said rack into locked engagement with said pinion gear at extreme positions of said movable means and for releasing said pinion gear upon initiation of movement of said movable means out of its extreme positions, a crank arm, and means movable by said crank arm from one extreme position to another for coperation with the means on the means movable by said crank means for effecting said wedging and said releasing operation.

6. Element positioning apparatus comprising a first crank arm, a second crank arm, each of said crank arms having two extreme operative positions, a rack for actuation by said second crank arm, a pitman lever for actuation by said first crank arm, an intermediate pinion freely rotatable on said lever for bodily movement with said lever, a lever arm extending normal to said lever and having a lateral extension, a shaft positioning rack in mesh with said intermediate pinion, and a roller mounted on said extension to engage said rack to wedge said rack into locking engagement with said pinion when both of said crank arms are in their extreme operative positions.

7. A positioning apparatus comprising a pinion gear, means driven by said pinion gear for aligning rows of type on a printing typewheel in a predetermined position, a first crank means, means actuated by said first crank means for moving said pinion gear bodily, means for mountnig said pinion gear for rotation on said means actuated by said first crank means, a rack meshing with said pinion gear to cause said gear to rotate when said gear is moved bodily, a second crank means for moving said rack from one position to another, and means mounted on said means actuated by the first crank means for wedging said rack into locked engagement with said pinion gear at extreme positions of said means actuated by the crank means and for releasing said wedging action upon initiation of movement of either of said crank means out of their extreme positions, said last-mentioned means comprising a roller carried by said means actuated by the first crank means in a position displaced from the pinion gear a greater distance than the shortest possible distance between the periphery of the gear and roller plus the rack.

8. A position apparatus comprising a pinion gear, means driven by said pinion gear for aligning rows of type on a printing typewheel with a predetermined position, a first crank means, a lever actuated by said first crank means for moving said pinion gear bodily, means for mounting said pinion gear for rotation on said lever, a rack meshing with said pinion gear to cause said gear to rotate when said gear is moved bodily, a second crank means for moving said rack from one position to another, and means mounted on said lever for wedging said rack into locked engagement with said pinion gear at extreme positions of both of said crank means and for releasing said wedging action upon initiation of movement of either of said crank means out of their extreme positions, said last mentioned means including a roller bearing against said rack and mounted on the lever in a position to move in an arcuate path relative to said rack upon movement of either of said crank means from their extreme positions.

9. Element positioning apparatus comprising a first crank arm, a second crank arm, a rack for actuation by said second crank arm, a pitman lever for actuation by said first arm, an intermediate pinion freely, rotatably mounted on said lever for bodily movement with said lever, a lever arm extending normal to said lever and having a lateral extension parallel to said lever, a roller mounted on said extension to engage said rack and hold it in mesh with said intermediate pinion, and a shaft positioning rack in mesh with said intermediate pinion for actuation by said intermediate pinion to position the element, said roller being movable arcuately relative to said crank actuated rack on movement of either of said crank arms.

References Cited in the file of this patent

UNITED STATES PATENTS

| 2,502,057 | Mitchell | Mar. 28, 1950 |

FOREIGN PATENTS

| 326,937 | Italy | June 27, 1935 |
| 493,248 | Belgium | July 13, 1950 |